(12) United States Patent
Lunttila et al.

(10) Patent No.: US 10,028,288 B2
(45) Date of Patent: Jul. 17, 2018

(54) APPARATUS AND METHOD FOR PROVIDING CARRIER INFORMATION (75) Inventors: Timo Erkki Lunttila, Espoo (FI); Frank Frederiksen, Klarup (DK); Esa Tapani Tiirola, Kempele (FI); Esa Malkamäki, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 223 days.

(21) Appl. No.: 13/700,478

(22) PCT Filed: Jun. 1, 2010

(86) PCT No.: PCT/EP2010/057637
§ 371 (c)(1),
(2), (4) Date: Mar. 4, 2013

(87) PCT Pub. No.: WO2011/150965
PCT Pub. Date: Dec. 8, 2011

(65) Prior Publication Data
US 2013/0163527 A1 Jun. 27, 2013

(51) Int. Cl.
*H04W 72/08* (2009.01)
*H04L 1/00* (2006.01)
*H04W 72/00* (2009.01)
*H04L 5/00* (2006.01)

(52) U.S. Cl.
CPC ......... *H04W 72/085* (2013.01); *H04L 1/0026* (2013.01); *H04L 1/0027* (2013.01); *H04L 5/001* (2013.01); *H04L 5/0057* (2013.01); *H04W 72/00* (2013.01)

(58) Field of Classification Search
CPC .. H04W 72/085; H04W 72/00; H04L 1/0026; H04L 1/0027; H04L 5/001; H04L 5/0057
See application file for complete search history.

(56) References Cited

U.S. PATENT DOCUMENTS

| 2006/0274712 | A1* | 12/2006 | Malladi | H04B 1/70735 370/345 |
| 2008/0025267 | A1* | 1/2008 | Wei | H04L 1/0025 370/337 |
| 2009/0161545 | A1* | 6/2009 | Ho | H04L 47/225 370/235 |

(Continued)

FOREIGN PATENT DOCUMENTS

| CN | 1684457 A | 10/2005 |
| WO | WO-2008/156061 A1 | 12/2008 |

OTHER PUBLICATIONS

Qualcomm Incorporated, 3GPP TSG RAN WG2 #68bis R2-100424, "Consideration on Carrier Activation", Valencia, Spain, Jan. 2010, 2 pages.

(Continued)

*Primary Examiner* — Christopher Crutchfield
*Assistant Examiner* — Tito Pham
(74) *Attorney, Agent, or Firm* — Harrington & Smith (57) ABSTRACT A method includes determining if one or more of a plurality of component carriers is not activated to be transmitted. The method further includes causing information indicating which one or more component carriers is not activated to be transmitted as part of channel state information signaling.

20 Claims, 6 Drawing Sheets (56) References Cited

U.S. PATENT DOCUMENTS

2011/0269490 A1* 11/2011 Earnshaw et al. ............ 455/509

OTHER PUBLICATIONS

Qualcomm Incorporated, 3GPP TSG RAN WG1 #61, R1-102745, "CQI for CA", May 2010, Montreal, Canada, 3 pages.
Mediatek, 3GPP TSG-RAN WG2 #69, R2-101150, "Discussion on CC Avtivation and Deactivation", San Francisco, United States, Feb. 2010, 4 pages.
InterDigital, 3GPP TSG-RAN WG2 Meeting #67bis, R2-095631, "RLF Procedures for Carrier Aggregation", Miyazaki, Japan, Oct. 2009, 3 pages.
CMCC, 3GPP TSG RAN WG1 meeting #58-bis, R1-094037, "UL ACK/NAK and CQI feedback in Carrier Aggregation", Miyazaki, Japan, Oct. 2009, 4 pages.
Samsung, 3GPP TSG RAN WG1 Meeting #60, R1-101144, "Component carrier activation an deactivation", San Francisco, USA, Feb. 2010, 5 pages.
R2-102886; 3GPP TSG-RAN WG2 Meeting #70; Nokia Corporation; "DRX and Carrier Aggregation"; Montreal, Canada, May 10-14, 2010, (7 pages).
"CC Activation and Deactivation", CATT, 3 GPP TSG RAN WG2 Meeting #70, May 10-14, 2010, R2-102798, 4 pgs.

* cited by examiner

APPARATUS AND METHOD FOR PROVIDING CARRIER INFORMATION

Some embodiments of the present invention relate to a method and apparatus for providing carrier information. In particular, but not exclusively, some embodiments of the present invention relate to a method and apparatus for providing carrier information for aggregated carriers.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. For example, it can be defined if carrier aggregation is used. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator. A further development of the LTE is referred to as LTE-Advanced (LTE-A). The LTE-Advanced aims to provide further enhanced services by means of even higher data rates and lower latency with reduced cost.

Carrier aggregation may be used to increase performance, especially for example, for peak data rate. In carrier aggregation a plurality of carriers are aggregated to increase bandwidth. Carrier aggregation comprises aggregating a plurality of component carriers CC into a carrier that is referred to in this specification as aggregated carrier.

In order to use the aggregated spectrum it may be required to provide Channel State Information (CSI) reporting for multiple component carriers.

According to one embodiment a method comprises: determining if one or more of a plurality of component carriers is not activated; and causing information, indicating which one or more component carriers is not activated, to be transmitted as part of channel state information signaling.

According to one embodiment a method comprises: receiving from a user equipment information, indicating which one or more component carriers is not activated, as part of channel state information signaling; and determining based on said information, which one or more component carriers are considered by the user equipment to be not activated.

According to one embodiment an apparatus comprises: means for determining if one or more of a plurality of component carriers is not activated; and means for causing information, indicating which one or more component carriers is not activated, to be transmitted as part of channel state information signaling.

According to one embodiment an apparatus comprises: means for receiving from a user equipment information, indicating which one or more component carriers is not activated, as part of channel state information signaling; and means for determining based on said information, which one or more component carriers are considered by the user equipment to be not activated.

According to one embodiment an apparatus comprises: at least one processor and at least one memory comprising computer program code, the at least one memory and the computer program code is configured, with the at least one processor to cause the apparatus to: determine if one or more of a plurality of component carriers is not activated; and cause information, indicating which one or more component carriers is not activated, to be transmitted as part of channel state information signaling.

According to one embodiment an apparatus comprises: at least one processor and at least one memory comprising computer program code, the at least one memory and the computer program code configured, with the at least one processor to cause the apparatus to: receive from a user equipment information, indicating which one or more component carriers is not activated, as part of channel state information signaling; and determine based on said information, which one or more component carriers are considered by the user equipment to be not activated.

Some embodiments will be now be described, by way of example only, with reference to the following examples and accompanying drawings in which.

In the following description certain exemplifying embodiments are explained with reference to wireless or mobile communication systems serving mobile communication devices. A wireless communication system and mobile communication device are briefly explained with reference to FIGS. 1 and 2.

A communication device can be used for accessing various services and/or applications provided via a communication system. In wireless or mobile communication systems the access is provided via a wireless access interface between mobile communication devices 1 and an appropriate access system 10. A mobile device 1 can typically access wirelessly a communication system via an access node such as at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
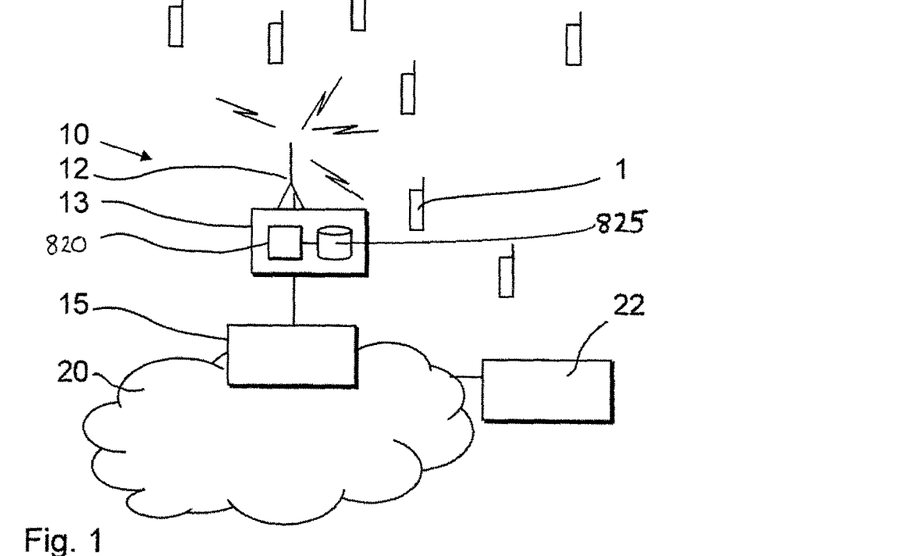
FIG. 1 shows an example of a communication system in which some embodiments of the present invention may be implemented.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory, at least one data processing unit and an input/output interface. The controller may be provided with memory capacity 825 and at least one data processor 820. It shall be understood that the control functions may be distributed between a plurality of controller units. The controller apparatus for a base station may be configured to execute an appropriate software code to provide the control functions as explained below in more detail.

In the example shown in FIG. 1, the base station node 12 is connected to a data network 20 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks. In some embodiments the base station node is an eNodeB.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
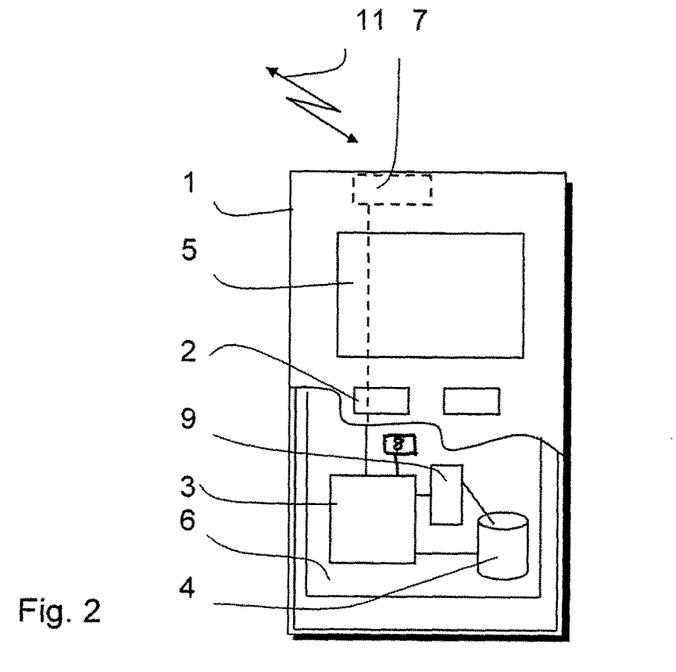
FIG. 2 shows an example of a communication device.

FIG. 2 shows a schematic, partially sectioned view of a communication device 1 that can be used for communication on an aggregated carrier 11 comprising a plurality of component carriers with at least one other wireless station. An appropriate mobile communication device may be provided by any device capable of sending and receiving radio signals. Non-limiting examples include a mobile station (MS) such as a mobile phone or smart phone, a portable computer provided with a wireless interface card or other wireless interface facility, personal data assistant (PDA) provided with wireless communication capabilities, or any combinations of these or the like.

A mobile communication device may be used for voice and video calls, for accessing service applications provided via a data network. The mobile device 1 may receive signals via appropriate apparatus for receiving and transmitting radio signals on wireless carriers, or radio bearers. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Some embodiments of the present invention may be implemented in an LTE-A system and may for example be part of the 3GPP LTE Rel-10. Of course other embodiments of the present invention may be used with other releases of the LTE standard. Yet further embodiments of the present invention may be used with the standards other than the LTE standard.

Some embodiments of the present invention may provide Channel State Information (CSI) feedback signaling with carrier aggregation. Carrier aggregation may allow larger bandwidth and peak data rate requirements to be achieved.

To efficiently use the aggregated spectrum, Channel State Information reporting for multiple component carriers may be provided. Some of the embodiments are such that the signaling addresses the potential error cases relating to ambiguity and the activation/deactivation component carriers.

Figure 3:
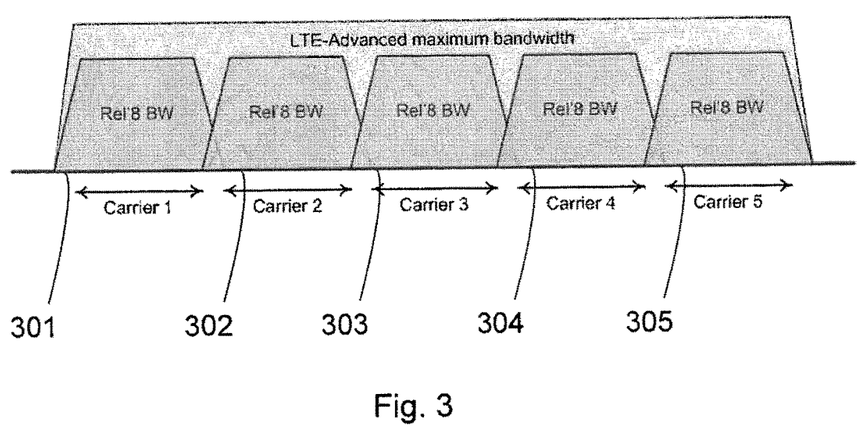
FIG. 3 shows an example of an aggregated carrier.

The principle of carrier aggregation is illustrated in FIG. 3 showing use of five component carriers 301, 302, 303, 304, 305 to form system bandwidth. 3GPP LTE-Advanced terminals adapted for operation in accordance with release 10 and upwards can receive and/or transmit simultaneously on multiple aggregated component carriers in the same transmission time interval (TTI). That is, two or more carriers, referred to herein as component carriers can be aggregated such that a communication device may simultaneously communicate one or multiple component carriers depending on its capabilities. It is noted that the component carriers of an aggregated carrier may be provided by different cells. It should be noted that in 3GPP terms each configured component carrier is considered as a serving cell, which are connected to an eNB. Typically the serving cells are collocated but sometimes remote radio heads (RRH) or repeaters/relays may be used for some component carriers. There is one Primary serving cell (Pcell) and zero or more Secondary serving cells (Scell) configured to a UE when carrier aggregation is used.

In one embodiment the Channel State Information comprises a Channel Quality Indicator (CQI), a Rank Indicator (RI) and a Precoding Matrix Indicator (PMI). CQI/PMI and RI reporting can be either periodic or aperiodic. The baseline mode for channel information feedback reporting is periodic reporting using the uplink physical control channel (PUCCH). The base station configures the periodicity parameters and the PUCCH resources via higher layer signaling (typically with RRC signaling)

Periodic reports are normally transmitted on PUCCH. However, if the UE is scheduled data in the UL the periodic report moves to the data channel (physical uplink shared channel PUSCH). The reporting period of the rank indicator (RI) is a multiple of CQI/PMI reporting periodicity. However, this is by way of example and the reports may have the same periodicity. It is of course possible that all three indicators have different periodicity or a different pair has one periodicity with the other indicator having a different periodicity. Different ones of the RI reports use the same PUCCH resource (PRB (physical resource block, Cyclic shift) as the CQI/PMI reports i.e. PUCCH format 2/2a/2b.

In addition to periodic reporting, it has been proposed in the 3GPP forum that the base station can in any subframe (excluding the ones when the UE in configured to DRX/DTX (discontinuous reception/transmission)) force the UE to send an aperiodic CQI report on PUSCH. The aperiodic CQI request is triggered with a specific bit in the uplink grant (transmitted on the physical downlink control channel (PDCCH)). Furthermore, it is possible to request the aperiodic CQI transmission without any simultaneous UL data transmission, i.e. aperiodic CQI only. Release 8 currently specifies a number of methods for aperiodic CQI reporting, and each UE is always configured via RRC (radio resource control) signaling to one aperiodic CQI reporting mode (if no explicit configuration, a specified default mode may be assumed depending on the transmission mode).

In LTE-Advanced both periodic and aperiodic reports may be supported. However, additionally there needs to be a way to support one or both reporting schemes with carrier aggregation. Two examples of schemes for extending CQI reporting for multiple CCs are:

Periodic reporting on PUCCH: There is independent reporting per CC. Separate reporting parameters are configured for each CC (for example periodicity, reporting mode, subframe offset etc.)

Aperiodic reporting on PUSCH: A detailed, frequency selective report is derived for only one CC, while for others CCs some coarse wideband information is provided.

MAC (medium access control)-level signaling may be used to activate/deactivate DL SCCs (downlink secondary component carriers) within the UE DL CC set. Another agreement from RAN2 is that a UE does not perform CQI measurements corresponding to de-activated CCs. Hence, there is no CQI measurement to report corresponding to the deactivated CCs. Furthermore, PUCCH may be transmitted only on one UL CC (PCC (Primary component carrier) or Pcell), so all UL feedback (ACK/NACK and CSI) on PUCCH for all DL CCs may be transmitted via PCC.

A problem with MAC-level signaling is that potential signaling errors related to MAC-level activation/deactivation create ambiguity between the UE and the base station on which CCs are active. One error case is related to NACK (negative acknowledgement) to ACK (acknowledgement) error, where the UE has not yet decoded correctly the MAC activation/deactivation message and has requested retransmission with NACK but the base station interprets the NACK as ACK and assumes that message was correctly received. Similarly, in an ACK to NACK error case, the UE has received an activation/deactivation message correctly and will apply the message but the base station decodes ACK as NACK and retransmits the message. Due to the ambiguity there can be severe error cases related to multiplexing of CQI corresponding to multiple CCs on PUCCH and PUSCH.

Figure 4:
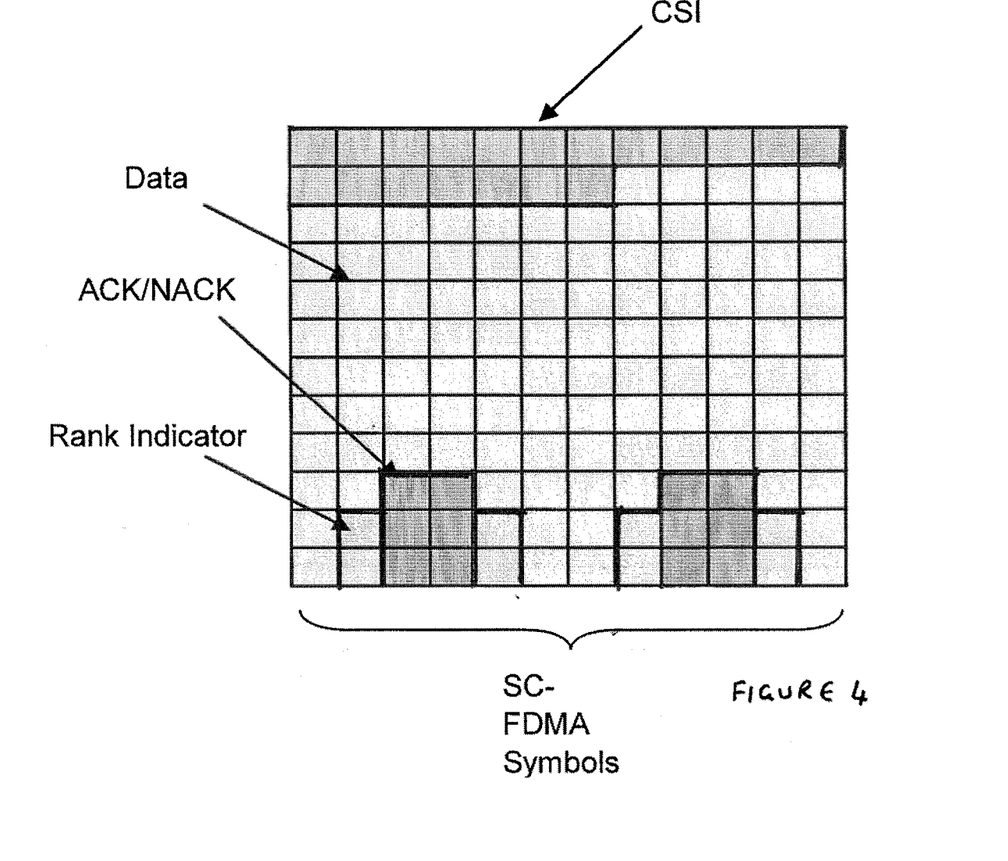
FIG. 4 schematically shows resource elements of an uplink shared channel.

Reference is made to FIG. 4 which schematically shows resource elements. FIG. 4 illustrates control/data multiplexing within a single UL carrier. The content of the control signals (for example, ACK/NACK, RI and CQI may related to multiple DL CCs). Each row represents a particular SC-FDMA (single-carrier frequency division multiplexing) symbol carrying a set of (virtual) subcarrier symbols or resource elements. In the arrangement shown in FIG. 4, the top row and the first eight symbols of the second row are reserved for the CSI resource elements. On the PUSCH, the starting position of the data resource element depends on the number of resource elements reserved for the CSI. In the example shown in FIG. 4, the data would start at the eighth symbol of the second row. However, if the number of CSI resource elements is unknown, the reception of data is not possible or at least difficult. Also shown in FIG. 4 is the rank indicator. The rank indicator is provided in this example in the eleventh and twelfth rows in column positions 2, 5, 8 and 11. The ACK/NACK elements are provided in rows 10, 11 and 12 and in column positions 3, 4, 9 and 10. It should be noted that column positions of ACK/NACK and rank indicator are pre-defined in the specification. Of course in alternative embodiments of the invention, the positions of the various elements may be different, for example with different standards. The number of symbols (i.e., rows in FIG. 4) may vary in a predetermined manner, for example based on the modulation and coding scheme selected for PUSCH.

Another example is CSI reporting on the PUCCH. The base station has no means to identify the number of downlink component carriers multiplexed into a single CSI report. One reason for this may be that there are no CRC (cyclic redundancy checking) bits included in the periodic CSI transmitted on the PUCCH.

Some embodiments of the present invention may provide uplink CSI signaling arrangements which may be reliable even if errors occur in the CC activation/deactivation process. It should be appreciated that embodiments of the invention may be used where the component carrier is not activated to be transmitted. The carrier component may be deactivated for transmission from the base station and/or user equipment. For example the component carrier may be configured but not activated or non-configured and not activated. The latter case may be applicable to inter-frequency measurements.

Some embodiments of the invention may provide standardised reporting to avoid or reduce error cases related to CA and CSI reporting caused by ambiguity related to CC activation/deactivation. Some embodiments may use an indicator which indicates that the component carrier in question is regarded by the UE as being deactivated. This indicator can be regarded as being channel status information. In embodiment this indicator may be a signaling state indicating that no report for a particular CC is available. The signaling state may be a bit-pattern, a symbol pattern, or any other suitable indication. In one embodiment such a signaling state is provided for the CQI report and is referred to as DTX-CQI. DTX corresponds to discontinuous transmission. In this context DTX-CQI means that corresponding CQI is not signaled at all. Instead a message indicating that CQI is not currently present is transmitted. It should be appreciated that such signaling state can additionally or alternatively be associated with other of the CSI information.

With the DTX-CQI the UE can indicate to the base station that according to the UE's understanding the CC in question has been deactivated.

If the UE assumes a given CC is deactivated and the UE is to send a CSI report for that CC, at least for a part of the CSI report(s), the report contents comprises information indicating that there is no report for this deactivated CC.

The UE may not measure CSI for deactivated SCCs. In some embodiments, the CSI resource is reserved when a SCC is configured, i.e., even deactivated SCCs have a CSI resource reserved. The DTX-CQI indication may be transmitted on the reserved CSI resource associated with the deactivated CC, when the SCC is configured but deactivated, and the UE does not perform CSI measurements.

In some embodiments of the invention, the usage of DTX-CQI is pre-defined so that both the UE and the base station are aware of it. In some embodiments, the DTX-CQI is signaled at least one of the following use cases:
Always when the UE is signaling, the CQI corresponding to configured but de-activated CC on either PUCCH or PUSCH;
Always when the UE is signaling, the CQI corresponding to configured but de-activated CC on PUSCH; and
Only in the case when the UE is signaling CQI corresponding to multiple CCs during one sub-frame (PUCCH and/or PUSCH) or TTI. In the cases that the UE is signaling a single CQI corresponding to single deactivated CC it may signal the DTX of the CC directly (i.e., send nothing). The base station may be capable of performing DTX detection and to identify whether the CC is activated or deactivated.

The DTX-CQI information may take any suitable form. By way of example only: One option is to define DTX CQI as a predefined (for example pseudo-random) bit pattern having low cross-correlation with respect to other possible CSI codewords i.e. the Euclidean or the Hamming distance between the DTX-CQI and the other possible CSI codewords should be maximized. The bit pattern would be signaled on the same resources as the regular encoded CSI would, that is replacing the encoded CSI codeword. This would minimize the possibility of misinterpreting the DTX-CQI as a CSI value.

Alternatively or additionally, the DTX-CQI could be indicated with the CQI entry corresponding to CQI Index "0" (out of range). In this option there would be no changes to the channel coding operation. The drawback is that it may not be possible to distinguish "DTX" from "out of range". However, this may not be an issue in some embodiments.

Embodiments of the present invention may provide periodic CSI reporting on the PUCCH and/or PUSCH.

In the case of periodic CSI signaling on PUCCH the RI (if configured) is sent in a different subframe than the CQI and PMI which are sometimes transmitted together. Any of the options for the DTX-CQI information may be used.

PUCCH: The CQI, PMI and/or RI encoded with a rate (20, N) Reed-Muller block code can be replaced with the DTX-CQI.

PUSCH: The CQI and/or PMI encoded with rate (32, N) Reed-Muller block code can be replaced with the DTX-CQI.

Alternatively, for both PUCCH and PUSCH, when the UE is configured to signal the RI, the RI field can be used to accommodate the DTX indication with a special bit/symbol pattern or information.

Alternatively, if a UE assumes a CC is deactivated and needs to transmit a CSI report containing one or more CQIs, the CQI Index "0" (or alternative suitable index) may be reported. This may be combined with e.g. RI signaling. For example, a combination of RI>1 and CQI index "0" could be interpreted as an explicit indication of DTX. Of course this information could be realised by values other than these example values or other combinations of CSI information.

In the case of periodic CSI reporting on PUCCH, sending DTX-CQI for all the deactivated CCs may lead to large number of redundant reports. Hence, in some embodiments the transmission of DTX-CQI is limited only to the cases when the CSI report would coincide with some other CSI report.

The DTX-CQI may be transmitted in other signaling combinations as well, e.g., in the cases when CSI coincides with some other UL signal such as SR (scheduling request) or ACK/NACK. Alternatively or additionally, it is also possible to multiplex DTX-CQI with other UL signals, e.g., to apply PUCCH format 2a/2b to multiplex DTX CQI with 1-bit/2-bit ACK/NACK on PUCCH.

Periodic CSI reporting on the PUSCH may be similar to the reporting on PUCCH.

Transmission of DTX-CQI may be made for all de-activated CC.

Transmission of DTX-CQI may be made only for those cases when the CSI report would coincide with some other CSI report (base station performs DTX detection from the PUSCH).

In some embodiments of the invention, there may be aperiodic CSI reporting on PUSCH.

In the case of aperiodic CQI on PUSCH the errors in the activation/deactivation procedure may lead to loss of both CSI and user data. This error case may be severe and need to be avoided. One outcome of the standardization is that a detailed and large (in terms of payload bits) CSI report is only derived for a single DL CC while for other CCs only a wideband CSI is provided. In such case the relative overhead for signaling the CSI always for all configured CCs (regardless of whether they are activated or not) may not cause excessive signaling overhead. The above described options for the special-bit pattern may be applicable for this case.

Some embodiments of the invention may have one or more of the following advantages. The severe error cases that might occur when the UE and the base station have different understanding on the active CC may be avoided. Explicit signaling allows also for identifying when an error has occurred in the activation/deactivation.

Figure 5:
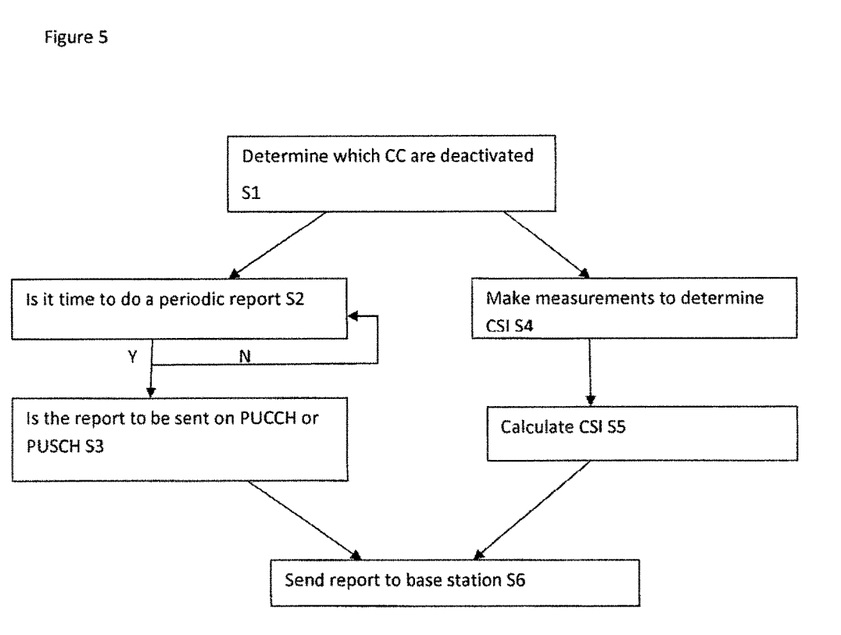
FIG. 5 schematically shows a first method.

Reference is made to FIG. 5 which shows a flow chart of one embodiment of the present invention. In step S1, the UE determines which component carriers of an aggregated carrier are considered to be deactivated. It should be appreciated that this determination can be made from determining which component carriers are considered to be activated, the remaining component carriers then being considered as deactivated. The determination as to whether or not a UE determines that particular component carrier to be deactivated may be dependent on the MAC level signaling received by the UE from the base station or it may be based on some timers (e.g., if a component carrier is not used for a given time it is considered as deactivated).

In step S2, a determination is made as to whether or not it is time to do a periodic report. In some embodiments of the present invention, the UE may be configured to provide a CSI report at predetermined time intervals. The periodic reports can occur at regular intervals in time or the time at which the periodic report is to be provided can be predetermined. The UE may incorporate a timing function 8 (see FIG. 2) which may be configured to count down and then reset to start counting down again. Alternatively, the timing function may be provided by using a clock signal and a counter which counts the number of clock signals defining the predetermined time.

If it is not time to do a periodic report, then a further check is made to see whether or not it is time to do a periodic report. In the example shown in FIG. 5, checks are made to see if it is time to do a periodic report. However, in alternative embodiments of the present invention instead of periodically checking to see whether it is time to do a periodic report, the arrangement is such that a signal or the like is provided when it is time to do a periodic report.

In step S3, a determination is made as to whether or not the CSI report is to be sent on the PUCCH or the PUSCH. In one embodiment of the present invention, the periodic report would normally be sent on the PUCCH. However, if the UE is scheduled data in the uplink, then the periodic report would instead be sent on the PUSCH.

In step S4, the necessary measurements are made and/or determined in order to determine the CSI. In step S5, the measurements are used to calculate the CSI. It should be appreciated that in some embodiments of the present invention, steps S4 and S5 may be provided in a single step and may for example be determined from information received by the UE.

In some embodiments of the present invention, steps S4 and S5 can take place in parallel to steps S2 and S3. Alternatively, steps S4 and S5 may take place before and/or after steps S2 and S3. In further embodiments, the CSI of the channels are being calculated regularly so that when the report needs to be sent the information is available.

It should be appreciated that step S1 does not need to be the first step and can take place in parallel with any of steps S2 to S5 and/or can precede or follow any of those steps. In one modification, the memory of the UE is configured to store information as each component carrier is either activated or deactivated. Accordingly, when information about which component carriers are activated or deactivated is required, the contents of the memory are read out.

In the final step S6, a report is sent to the base station. This report sends the associated CSI report. The information which is sent to the base station will include the relevant CSI information for the activated component carriers and for deactivated component carriers instead will include the appropriate DTX-CQI or any other of the indicators already discussed.

Figure 6:
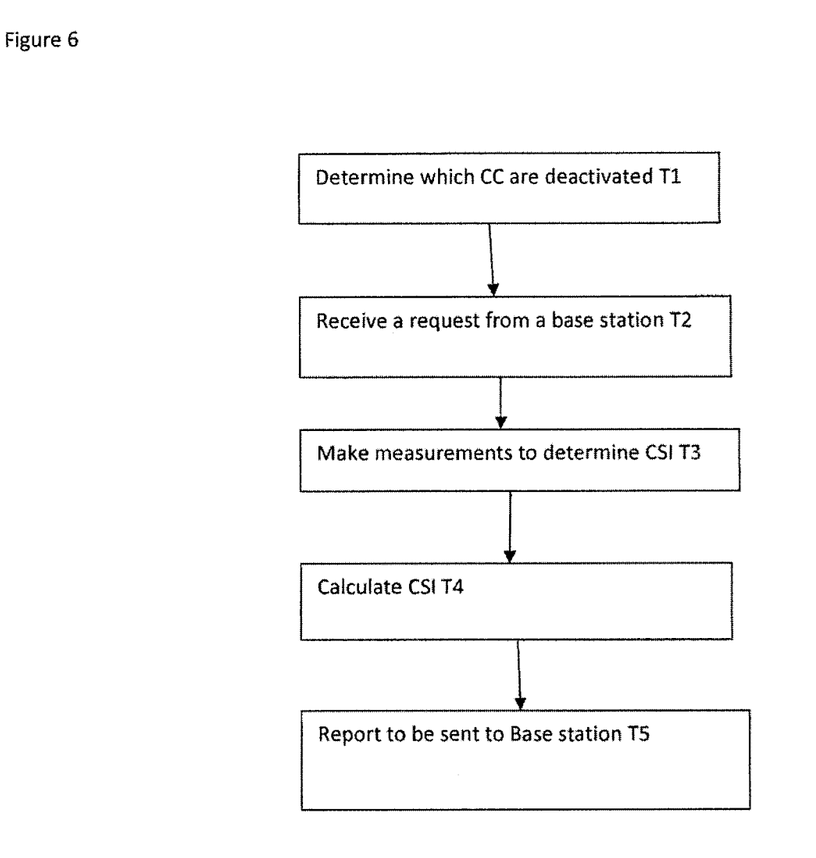
FIG. 6 schematically shows a second method.

Reference is made to FIG. 6 which shows a method of aperiodic reporting.

The first step T1 corresponds generally to S1 of FIG. 5.

In step T2, a request is received from the base station requesting an aperiodic CSI report.

Step T2 is followed by step T3 and T4 which correspond generally to steps S4 and S4 in some embodiments. In alternative embodiments of the present invention, these steps may be modified. For aperiodic reporting, a detailed frequency select report is derived for only one component carrier whilst for the other components carriers some coarse wideband information is provided. This means that the measurements made and the calculations from that measurement may be different to those described in FIG. 5. Again, steps T3 and T4 may be combined. Steps T3 and T4 may take place in parallel or prior to step T2.

In step T5, a report is provided for sending on the PUSCH which contains the required information for the active component carriers and for the deactivated component carriers information as previously discussed is provided in that report.

It should be appreciated that the method described in relation to FIGS. 5 and 6 may take place in the UE. However, in one modification to the present invention, such method may be performed at least partially in a base station. One or more of the steps shown in FIG. 5 or 6 may take place in the one or more of the processors of the user equipment, for example the at least one data processing entity potentially in conjunction with at least one memory and/or the other possible components. One or more of the steps of FIGS. 5 and 6 may be performed when one or more associated instructions are run on one or more of the processors. It should be appreciated that the one or more associated instructions may be stored in one or more memories of the UE.

In some alternative embodiments, there is no MAC level activation/deactivation. Instead RRC level configuration of component carriers is used. In such a case in order to save in UE power consumption, a CC specific DRX (discontinuous reception) scheme has been proposed which depending on the activity on each CC, UE will monitor PDCCH more or less often on each CC. The UE may not send CQI reports when in a DRX mode. Similar to deactivation, a UE and base station may not always have same understanding which CCs are in DRX and which CCs the UE is monitoring (and thus also reporting CQI in an Active Time). Thus embodiments of the invention may also be used for CCs in DRX, i.e., the UE reporting the CQI for the one or more CCs which are not in DRX and also reporting DTX-CQI (=absence of CQI) for CCs in DRX.

Figure 7:
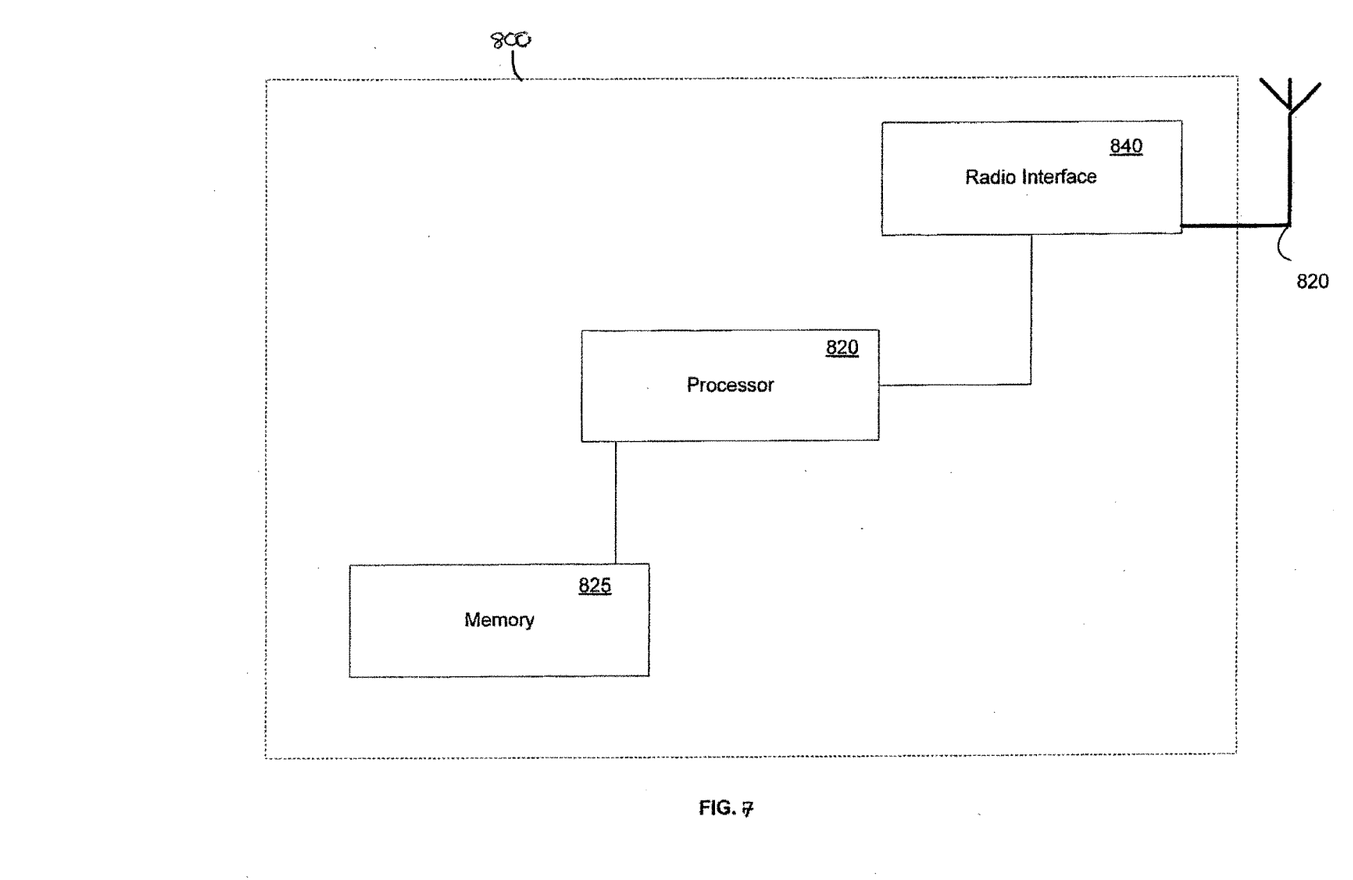
FIG. 7 schematically shows a base station.

FIG. 7 depicts an exemplary apparatus 800 for use in a base station. The apparatus may be connected to an antenna 820 for receiving via a downlink and transmitting via an uplink. The apparatus also includes a radio interface 840, which may comprise one of more of the following components such as filters, converters (e.g., digital-to-analog converters and the like), symbol demappers, an Inverse Fast Fourier Transform (IFFT) module, and the like, to process symbols, such as OFDMA symbols, carried by a downlink or an uplink. The apparatus further includes a processor 820 for controlling the base station and for accessing and executing program code stored in memory 825. It should be appreciated that the processor 820 can comprises one or more processors in practice and the memory 825 may be arranged to comprise one or more memories in practice.

The apparatus of the base station may be configured to receive the report sent by the UE. In response to receiving the report, the base station determines which of the CC are considered by the UE to be deactivated. The base station will operate in accordance with that determination. One or more of the steps performed by the apparatus of the base station may be performed when one or more associated instructions are run on one or more of the processors. It should be appreciated that the one or more associated instructions may be stored in one or more memories of the base station.

Embodiments of the present invention have described specific channel state information. It should be appreciated that the examples of the channel state information given is by way of example only and can include additional and/or alternative channel state information. The channels on which the report is provided are by way of example only and any other suitable channel can instead be used.

In some embodiments, the transmission of information may only happen if a CSI on that deactivated CC is configured to be transmitted in that subframe/TTI (or requested to be transmitted) and the status information indicating the deactivation of the particular CC is provided as the channel status information. As explained above, the CSI may only transmit when configured or requested. Thus in a given subframe CSI may be transmitted for one or some of the activated CCs but not for some other activated CCs. The same applies to the CSI information indicating deactivation for the not activated CCs.

In one embodiment, if CSI should be sent for a not activated CC in this TTI and if a CSI should also be sent for an activated CC in this TTI, then sending information indicating that the CC is not activated together with the CSI for the activated CC (replacing the CSI of the not activated CC with said information). An alternative embodiment could be such that said information about a deactivated CC is sent even if no other CSI (activated or deactivated) is sent in that TTI.

It should be appreciated that at least some of the method steps may be implemented by one or more computer programs. Such computer program(s) may comprise one or more computer instructions which when run on one or more processors cause the associated method step to be performed.

Whilst embodiments of the present invention have been described in relation to the LTE systems, it should be appreciated that embodiments of the present invention can be used in conjunction with any other suitable standard.

It is noted that whilst embodiments may have been described in relation to user equipment or mobile devices such as mobile terminals, embodiments of the present invention may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. The data processing entities may be controlled by one or more computer programs which may be stored in one or more memories of the apparatus.

Alternatively or additionally appropriately adapted computer program code product may be used for implementing the embodiments, when loaded to a computer or a processor. The program code product for providing the operation may be stored on and provided by means of a carrier medium such as a carrier disc, card or tape. A possibility may be to download the program code product via a data network.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the inventions may be practiced in various components such as integrated circuit modules. The design of integrated circuits can be by and large a highly automated process. Complex and powerful software tools may be available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. may automatically route conductors and locate components on a semiconductor chip using well established rules of design as well as libraries of pre-stored design modules.

Once the design for a semiconductor circuit may have been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
    determining, by a user device, that one or more component carriers of a plurality of component carriers is not activated; and
    causing, by the user device, information indicating which one or more component carriers of the plurality of component carriers is not activated, to be transmitted as part of channel state information signaling, wherein said information comprises a predefined discontinuous transmission—channel quality indicator provided as a predetermined pseudo-random bit pattern having a low cross-correlation with respect to channel state information corresponding to activated component carriers, wherein the predefined discontinuous transmission—channel quality indicator is transmitted on same reserved resources to be used for providing channel state information for said one or more component carriers were said one or more component carriers activated.

2. The method as claimed in claim 1, comprising causing channel state information to be transmitted for at least one activated component carrier of an aggregated carrier and for at least one not activated component carrier said information indicating that the one or more component carriers is not activated.

3. The method as claimed in claim 1, comprising causing component carrier specific channel state information to be signaled in dependence on a predetermined channel specific configuration.

4. The method as claimed in claim 1, comprising causing said information to be signaled by a combination of values associated with a plurality of different types of channel state information.

5. The method as claimed in claim 1, comprising causing said information, indicating which one or more component carriers is not activated, to be transmitted periodically.

6. The method as claimed in claim 1, comprising causing said information, indicating which one or more component carriers is not activated, to be transmitted in response to a received request.

7. The method as claimed in claim 1, comprising causing said information to be transmitted on one of a control channel and a shared channel.

8. The method as claimed in claim 1, comprising causing said information, indicating said that a component carriers is not activated, to be transmitted only when a user equipment is signaling channel state information corresponding to a plurality of component carriers during one time period.

9. The method as claimed in claim 1, comprising causing said channel state information to be transmitted for at least one activated component carrier of an aggregated carrier and for at least one not activated component carrier, said information comprising first channel state information for the at least one activated component carrier and second channel state information comprising for each of the at least one not activated component carriers a predetermined signaling state indicating that the one or more component carriers is not activated.

10. The method as claimed in claim 1, wherein the low cross-correlation comprises the predefined discontinuous transmission—channel quality indicator provided as the predetermined pseudo-random bit pattern having a lower cross-correlation than other possible channel state information codewords.

11. A method comprising:
receiving from a user equipment, by a network node as part of channel state information, signaling comprising information indicating which one or more component carriers of a plurality of component carriers is not activated; and
determining by the network node based on said information, that one or more component carriers of the plurality of component carriers are considered by the user equipment to be not activated, wherein said information comprises a predefined discontinuous transmission—channel quality indicator provided as a predetermined pseudo-random bit pattern having a low cross-correlation with respect to channel state information corresponding to activated component carriers, and wherein the predefined discontinuous transmission—channel quality indicator is received on same reserved resources to be used for providing channel state information for said one or more component carriers were said one or more component carriers activated.

12. An apparatus comprising:
at least one processor and at least one memory comprising computer program code, the at least one memory and the computer program code configured, with the at least one processor to cause the apparatus to:
determine if one or more of a plurality of component carriers is not activated; and
cause information, indicating which one or more component carriers of the plurality of component carriers is not activated, to be transmitted as part of channel state information signaling, wherein said information comprises a predefined discontinuous transmission—channel quality indicator provided as a predetermined pseudo-random bit pattern having a low cross-correlation with respect to channel state information corresponding to activated component carriers, and wherein the predefined discontinuous transmission—channel quality indicator is transmitted on same reserved resources to be used for providing channel state information for said one or more component carriers were said one or more component carriers activated.

13. The apparatus as claimed in claim 12, wherein the at least one memory and the computer program code are configured, with the at least one processor to cause the apparatus to cause channel state information to be sent for at least one activated component carrier of an aggregated carrier and for at least one component carrier which is not activated, said information indicating that the one or more component carriers is not activated.

14. The apparatus as claimed in claim 12, wherein the at least one memory and the computer program code are configured, with the at least one processor to cause the apparatus to cause component carrier specific channel state information to be signaled in dependence on a predetermined channel specific configuration.

15. The apparatus as claimed in claim 12, wherein the at least one memory and the computer program code are configured, with the at least one processor to cause the apparatus to cause said information to be signaled by a combination of values associated with a plurality of different types of channel state information.

16. The apparatus as claimed in claim 12, wherein the at least one memory and the computer program code are configured, with the at least one processor to cause the apparatus to cause said information, indicating which one or more component carriers is not activated, to be transmitted periodically.

17. The apparatus as claimed in claim 12, wherein the at least one memory and the computer program code are configured, with the at least one processor to cause the apparatus to cause said information, indicating which one or more component carriers is not activated, to be transmitted in response to a received request.

18. The apparatus as claimed in any claim 12, wherein the at least one memory and the computer program code are configured, with the at least one processor to cause the apparatus to cause said information to be transmitted on one of a control channel and a shared channel.

19. The apparatus as claimed in claim 12, wherein the at least one memory and the computer program code are configured, with the at least one processor to cause the apparatus to cause said information, indicating said that a component carrier is not activated, to be transmitted only when a user equipment is signaling channel state information corresponding to a plurality component carriers during one time period.

20. An apparatus comprising:
at least one processor and at least one memory comprising computer program code, the at least one memory and the computer program code configured, with the at least one processor to cause the apparatus to:
receive from a user equipment information, as part of channel state information signaling, indicating which one or more of a plurality of component carriers is not activated; and
determine based on said information, that one or more component carriers of the plurality of component carriers are considered by the user equipment to be not activated, wherein said information comprises a predefined discontinuous transmission—channel quality indicator provided as a predetermined pseudo-random bit pattern having a low cross-correlation with respect to channel state information corresponding to activated component carriers, and wherein the predefined discontinuous transmission—channel quality indicator is received on same reserved resources to be used for providing channel state information for said one or more component carriers were said one or more component carriers activated.

* * * * *